(12) United States Patent
Sasso et al.

(10) Patent No.: US 8,719,413 B1
(45) Date of Patent: May 6, 2014

(54) METHOD AND APPARATUS FOR IMPLEMENTING A RECOVERY ACTION IN RESPONSE TO A STATE CHANGE IN A STORAGE AREA NETWORK

(75) Inventors: Christian Sasso, Milpitas, CA (US); Ronak Desai, Fremont, CA (US); Siddharth Kasat, Santa Clara, CA (US)

(73) Assignee: Cisco Technology, Inc., San Jose, CA (US)

(*) Notice: Subject to any disclaimer, the term of this patent is extended or adjusted under 35 U.S.C. 154(b) by 1785 days.

(21) Appl. No.: 11/960,893

(22) Filed: Dec. 20, 2007

(51) Int. Cl.
*G06F 13/00* (2006.01)
*G06F 15/177* (2006.01)
*G06F 13/40* (2006.01)
*G06F 15/173* (2006.01)
*G06F 11/00* (2006.01)

(52) U.S. Cl.
USPC ........... 709/226; 709/223; 709/224; 709/225; 709/227; 710/104; 710/105; 710/106

(58) Field of Classification Search
USPC ............................ 709/223; 711/163; 370/400
See application file for complete search history.

(56) References Cited

U.S. PATENT DOCUMENTS

| | | | | |
|---|---|---|---|---|
| 2003/0208581 | A1* | 11/2003 | Behren et al. | 709/223 |
| 2005/0018673 | A1* | 1/2005 | Dropps et al. | 370/389 |
| 2005/0086332 | A1* | 4/2005 | Nakazawa | 709/223 |
| 2005/0234941 | A1* | 10/2005 | Watanabe | 707/100 |
| 2006/0023707 | A1* | 2/2006 | Makishima et al. | 370/389 |
| 2006/0080656 | A1* | 4/2006 | Cain et al. | 717/174 |
| 2006/0136633 | A1* | 6/2006 | Harima et al. | 710/104 |
| 2007/0079091 | A1* | 4/2007 | Collins et al. | 711/163 |
| 2007/0094378 | A1* | 4/2007 | Baldwin et al. | 709/223 |

OTHER PUBLICATIONS http://webdocs.cs.ualberta.ca/~yuan/courses/692/09fall/references/intro_san.pdf "Introduction to SAN"—Sep. 2006, Tate et al, IBM.*
http://public.dhe.ibm.com/storage/san/es3232/SMES3232.pdf "IBM SAN Interoperability Matrix for Midrange M-Type SAN Switches"—IBM Jun. 2006.*

* cited by examiner

*Primary Examiner* — Randy Scott
(74) *Attorney, Agent, or Firm* — P. Su

(57) ABSTRACT

Methods and apparatus for reconfiguring a fabric associated with a storage area network (SAN) are disclosed. According to one aspect of the present invention, a method includes undergoing an update process, the update process being arranged to update software associated with a switch. The switch is included in a SAN fabric. The method also includes determining when the update process is completed, and ascertaining whether there is at least one state change associated with the SAN fabric when the update process is completed. Finally, the method includes initiating a recovery action in the SAN fabric if there is at least one state change associated with the SAN fabric.

22 Claims, 11 Drawing Sheets

METHOD AND APPARATUS FOR IMPLEMENTING A RECOVERY ACTION IN RESPONSE TO A STATE CHANGE IN A STORAGE AREA NETWORK

BACKGROUND OF THE INVENTION

The present invention relates generally to storage area networks (SANs).

A storage area network (SAN), which is generally part of an overall communications network or fabric, is an infrastructure that interconnects storage devices. Often, SANs may include elements such as switches that enable storage communications to occur. Such switches may be arranged to be updated, e.g., may be arranged to receive and substantially implement software updates, while such switches are in use within a SAN.

A SAN may be reconfigured when a software update is implemented with respect to a switch in the SAN. That is, a fabric may reconfigure during a software update on a switch within the fabric. The reconfiguration of the SAN when a software update is implemented, which is often a time-consuming process, effectively updates the state of the interfaces associated with all of the switches in the SAN. Additionally, the reconfiguration of the entire fabric of the SAN each time a software update is implemented substantially ensures that there are no discrepancies between the state of entire fabric and the state stored on a switch which received a software update.

BRIEF DESCRIPTION OF THE DRAWINGS

The invention will be readily understood by the following detailed description in conjunction with the accompanying drawings, wherein like reference numerals designate like structural elements, and in which.

DESCRIPTION OF EXAMPLE EMBODIMENTS

General Overview

Figure 1A:
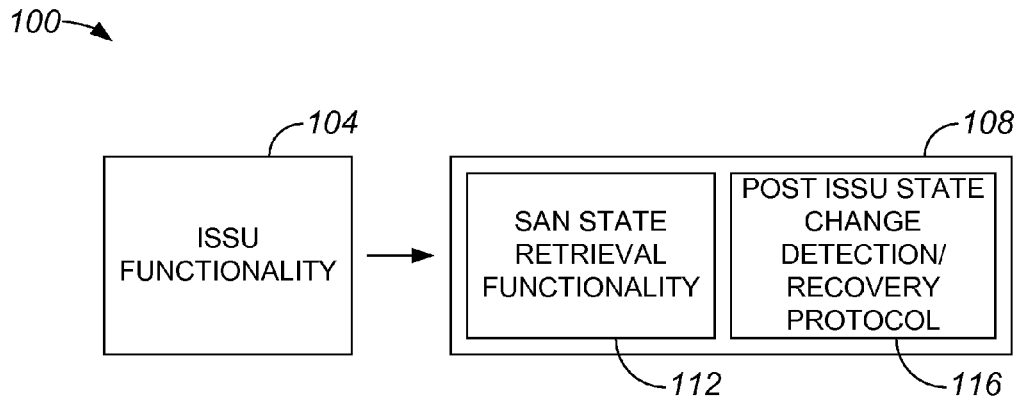
FIG. 1A is a block diagram representation of a system in which a single layer includes storage area network (SAN) state retrieval functionality, as well as a post in service software upgrade (ISSU) state change detection and recovery protocol, in accordance with an embodiment of the present invention.

In one embodiment, a method includes undergoing an update process, the update process being arranged to update software associated with a switch. The switch is included in a storage area network (SAN) fabric. The method also includes determining when the update process is completed, and ascertaining whether there is at least one state change associated with the SAN fabric when the update process is completed. Finally, the method includes initiating a recovery action in the SAN fabric if there is at least one state change associated with the SAN fabric.

Description

Triggering a recovery, or reconfiguration, action in a storage area network (SAN) substantially only when there has been a state change associated with the SAN enables the SAN to operate efficiently. A recovery process generally includes the flooding of frames in the SAN, e.g., a build fabric (BF) process or a reconfigure fabric (RCF) process associated with an overall recovery process typically floods frames in the SAN. By substantially only flooding frames in the SAN when it is known that there has been a state change associated with the SAN, and that a switch in the SAN was undergoing an in service software upgrade (ISSU) when the state change occurred, the flooding of frames in the SAN may be reduced. That is, by reconfiguring a SAN substantially only when a state change is known to have occurred, rather than reconfiguring the SAN whenever an ISSU has occurred, the performance of the SAN is affected by the flooding of frames less often.

A state change may occur within a SAN if, for example, while a particular switch, e.g., a single-supervisor switch, is undergoing an ISSU, a flap occurs on a link within the SAN. As will be appreciated by those skilled in the art, a flap is either a link going down and staying down, or a link going down and then coming back up. That is, a flap is either a relatively sustained link failure or a relatively temporary link failure. When a flap occurs, switches affected by the flap may initiate a process of selecting a principal switch that is responsible for assigning domain identifiers (IDs), and obtaining domain IDs from the principal switch. Such a process generally results in a state changes, e.g., changes to the states of the interfaces associated with the SAN.

Typically, before a switch undergoes an ISSU, the switch may obtain and store a "snapshot" of the latest exchange fabric parameters (EFP) frame sent by the principal switch within a SAN. This EFP frame generally contains a list of substantially all the domains assigned within the SAN, the world wide names (WWNs) of the switches which were assigned domains by the principal switch, and the WWN of the principal switch. When a state change occurs while a switch is undergoing an ISSU, once the ISSU is completed, the snapshot stored inside the switch may be determined not to match a current snapshot of the EFP frame assigned within the SAN. By way of example, the domains or the WWNs may be different, or the match between the domains and the WWNs that own the domains may have changed, and the WWN of the principal switch may have changed, etc. Such a mismatch may then trigger a reconfiguration of the SAN by the switch that underwent the ISSU.

When a single-supervisor switch performs an ISSU, a software stack of the switch may be rebooted into an upgraded version while hardware of the switch continues to forward data, e.g., between disks and hosts that populate the SAN fabric. While the operating system of the switch upgrades to a new version, the switch is unable to properly handle changes in the state of its interfaces. Hence, after the switch is upgraded, i.e., after the ISSU is completed, if the state of its interfaces has changed due to an event such as a flap within an overall SAN, a reconfiguration may be triggered. However, if the state of the interfaces of the switch is determined not to have changed, no reconfiguration is triggered.

A framework which allows an "intelligent" determination of whether to reconfigure a fabric generally includes functionality that allows information used in such a determination to be obtained, and functionality that both makes the determination and causes a reconfiguration of the fabric as appropriate. The functionality associated with an intelligent determination may be implemented as a substantially single layer associated with a framework, or as more than one layer associated with the framework.

Referring initially to FIG. 1A, a system in which a single layer includes SAN state retrieval functionality, as well as a post ISSU state change detection and recovery protocol, will be described in accordance with an embodiment of the present invention. A system 100 may be substantially any component of a SAN fabric, e.g., a single supervisor switch. System 100 includes ISSU functionality 104 and processing functionality 108 that includes both SAN state retrieval functionality 112 and post ISSU state change detection/recovery functionality. ISSU functionality 104 and processing functionality 108 may include hardware logic and/or executable software logic that is embodied in a tangible media.

ISSU functionality 104 is arranged to allow a software upgrade to occur on system 100 while system 100 is in service. In one embodiment, ISSU functionality 104 is such that during a software upgrade, hardware (not shown) of system 100 may continue to receive and to forward data through a SAN fabric. In other words, ISSU functionality 104 may include logic that enables hardware to continue switching while software is updated.

Processing functionality 108 is arranged to substantially operate after an ISSU is completed using ISSU functionality 104. SAN state retrieval functionality 112 may be arranged to obtain a current snapshot of the state of the SAN fabric, e.g., from a principal switch associated with system 100. SAN state retrieval functionality 112 may also obtain a previous snapshot of the state of the SAN fabric that was stored by system 100 prior to, or approximately at the onset of, an ISSU. Using the snapshots, post ISSU state change detection/ recovery functionality 116 may determine if there is a mismatch in the states, and trigger a recovery or reconfiguration of the SAN fabric if there is a mismatch.

Figure 1B:
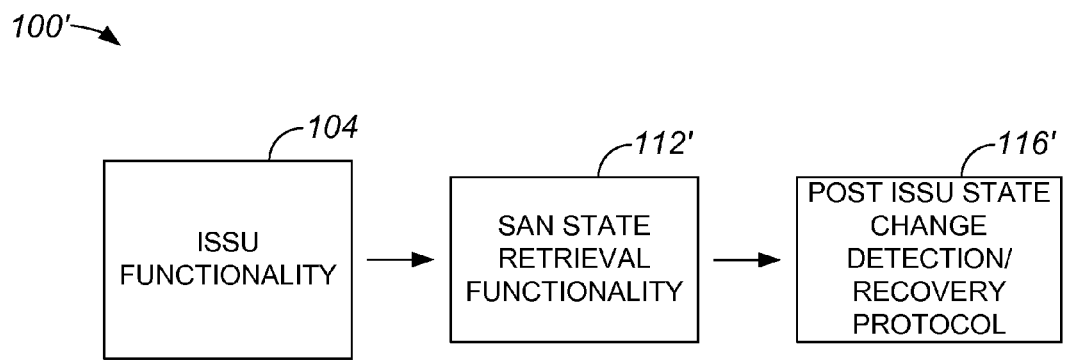
FIG. 1B is a block diagram representation of a system in which SAN state retrieval functionality is include in a separate layer in accordance with an embodiment of the present invention.

In lieu of SAN state retrieval functionality 112 and post ISSU state change detection/recovery protocol 116 being included in a substantially single layer within system 100, SAN state retrieval functionality 112 and post ISSU state change detection/recovery protocol 116 may instead be included in separate layers. FIG. 1B is a block diagram representation of a system in which SAN state retrieval functionality is included in a separate layer from a post ISSU state change detection and recovery protocol in accordance with an embodiment of the present invention. As shown in FIG. 1B, a system 100' may include ISSU functionality 104 in one layer, SAN state retrieval functionality 112' in another layer, and post ISSU state change detection/recovery functionality 116'.

Figure 2:
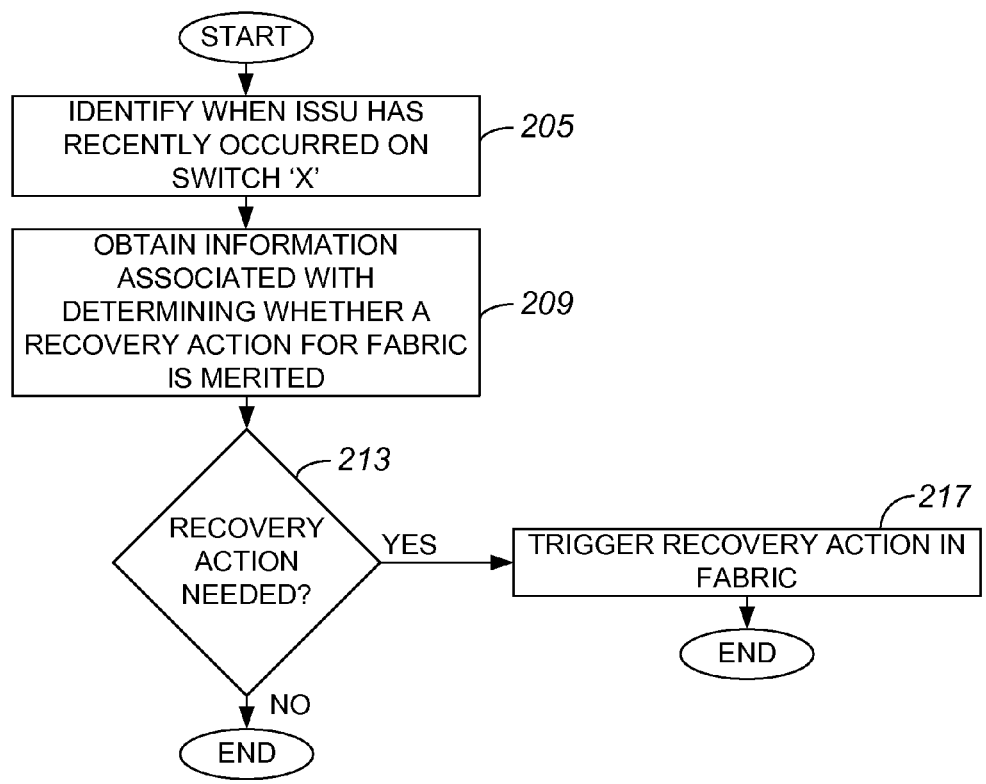
FIG. 2 is a process flow diagram which illustrates an overall method of processing an ISSU in accordance with an embodiment of the present invention.

After an ISSU occurs with respect to a component in a SAN fabric, processing is performed to ascertain whether to trigger a recovery action in the SAN fabric. That is, the ISSU is effectively processed. FIG. 2 is a process flow diagram which illustrates a general method of processing an ISSU in accordance with an embodiment of the present invention. A method 201 of processing an ISSU begins at step 205 in which it is identified when an ISSU has recently occurred on switch 'X'. Typically, switch 'X', which is a part of the fabric of a SAN, will ascertain when an update has occurred, e.g., been relatively recently completed, with respect to switch 'X'.

Once it has been identified that an ISSU has relatively recently occurred, information that may be used to determine whether a recovery action is merited for the fabric is obtained in step 209. In the described embodiment, the switch on which the ISSU occurred determine whether a recover action is to be approved. It should be appreciated, however, that in certain cases, substantially any switch or node in the fabric of the SAN may obtain information that may be used to determine whether a recovery action is to be performed. The information that is obtained may vary widely, and may include information relating to current domain IDs within the fabric and information relating to frames that are received, e.g., by the switch on which the ISSU has recently occurred.

After the information is obtained, it is determined in step 213 whether a recovery action, e.g., a reconfiguration of the SAN, is needed. The determination may be made using the information obtained in step 209. In general, any switch or node in the fabric of the SAN may make a determination regarding whether a recovery action is needed. Typically, the switch or node which obtained the information in step 209 may make the determination of whether a recovery action, or a reconfiguration of the SAN, is needed.

If it is determined in step 213 that a recovery action is not needed, then the recovery action is not performed. As such, the method of processing an ISSU is completed. Alternatively, if it is determined in step 213 that a recovery action is needed, a recovery action is triggered in the fabric in step 217. In general, triggering the recovery action in the fabric may include, but is not limited to including, selecting a principal switch within the fabric, and allowing that principal switch to effectively reconfigure the fabric.

Figure 3:
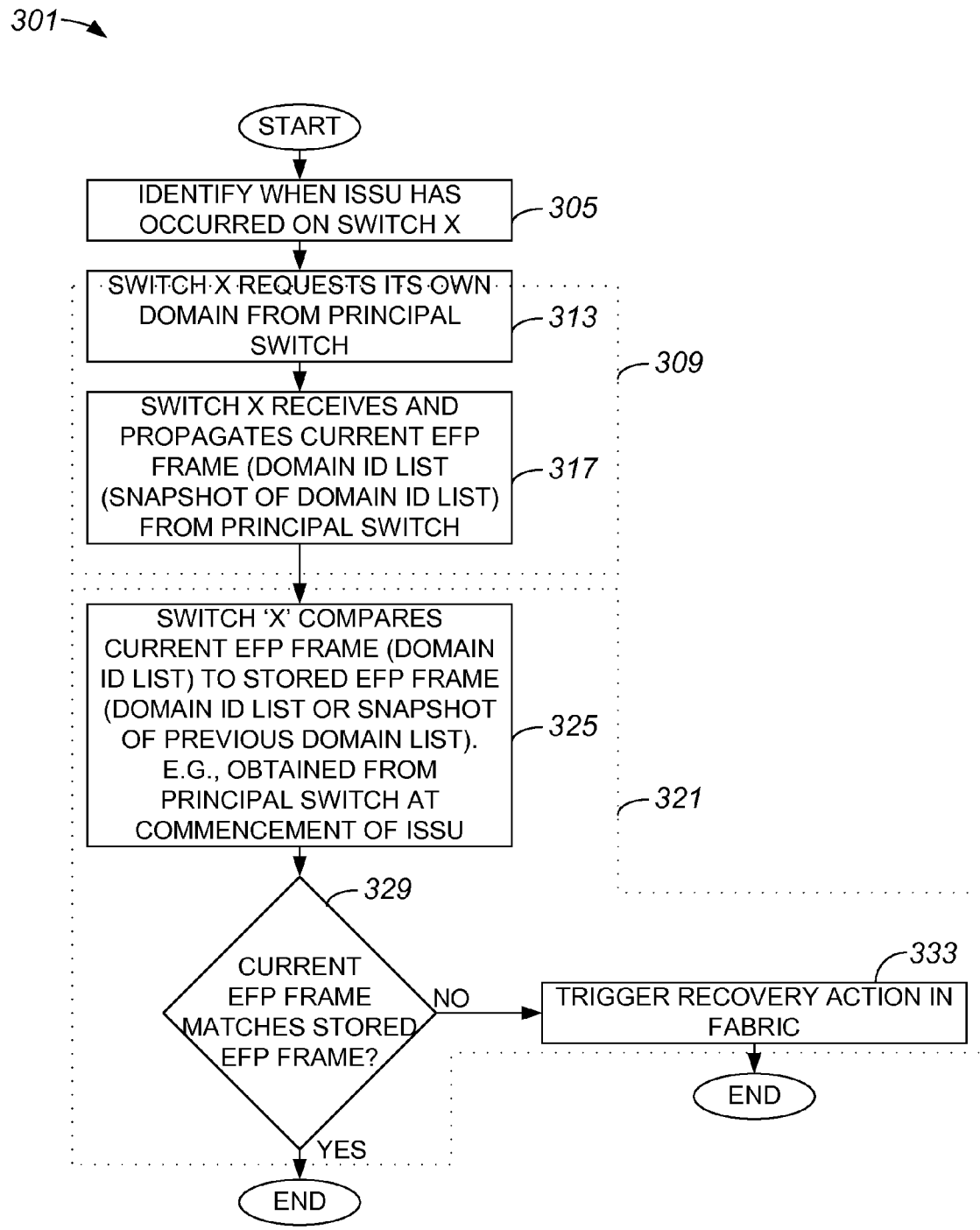
FIG. 3 is a process flow diagram which illustrates a method of processing an ISSU that includes comparing exchange fabric parameters (EFP) requests frames that effectively contain snapshots of domain ID lists in accordance with an embodiment of the present invention.

Processing an ISSU may include, in one embodiment, a comparison of snapshots that provide information relating to domain IDs assigned within a fabric. A snapshot obtained prior to the ISSU may be compared with a snapshot obtained substantially immediately after the ISSU to determine if any changes, as for example state changes, are present. In other words, snapshots taken at different times relative to the performance of an ISSU may be compared to determine if there is a mismatch. Referring next to FIG. 3, a method of processing an ISSU that includes comparing snapshots of domain ID lists will be described in accordance with an embodiment of the present invention. A method 301 of processing an ISSU begins at step 305 in which the occurrence, e.g., recent occurrence, of an ISSU on a switch 'X' within a SAN fabric is identified.

Once an occurrence of an ISSU is identified, process flow moves to an overall step 309 in which SAN state retrieval is performed. Overall step 309 includes step 313 and step 317. In step 313, switch 'X' requests a domain ID from a principal switch of the fabric. That is, switch 'X' requests its own domain ID from the principal switch. As will be appreciated by those skilled in the art, a domain ID may be requested by sending a request domain ID (RDI) request frame to the principal switch via an upstream link. After switch 'X' requests the domain ID, switch 'X' receives the domain ID as well as a list of current domain IDs recognized by the principal switch in the fabric in step 317. Switch 'X' receives and propagates the current domain ID list or a snapshot of the domain ID list. Switch 'X' may receive the current domain ID from the principal switch in an EFP request frame that includes information relating to domain IDs and WWNs within the fabric. It should be appreciated that when a domain ID and a list of current domain IDs are received, they are typically received in, but are not limited to being received in, an EFP request frame that also includes information relating to associated WWNs.

Upon propagating the current domain ID list, e.g., as a part of the EFP request frame, a post ISSU state change detection and recovery is performed in an overall step 321. Overall step 321 includes step 325, step 329, and step 333. In step 325, the current EFP request frame is compared to the stored EFP request frame, e.g., the current domain ID list is compared to a stored domain ID list. In one embodiment, switch 'X' compares the current domain ID list to a stored domain ID list. Herein and after, a comparison of domain ID lists may generally be referred to as a comparison of EFP request frames. The EFP request frame or domain ID list stored in switch 'X', for example, may be a EFP request frame or a domain ID list obtained from the principal switch at the commencement of the ISSU. Alternatively, a switch to which switch 'X' has propagated the current EFP request frame may compare the current EFP request frame to an EFP request frame stored on that switch to determine whether there is a mismatch. As previously mentioned, an overall comparison may be made between an EFP request frame associated with the current domain ID list and an EFP associated with the stored domain ID list. Such a comparison may include, but is not limited to including, comparing domain IDs and WWNs. It should be appreciated that the domain ID list obtained at the commencement of the ISSU is generally stored such that when the current domain ID list is obtained, the current domain ID list does not overwrite the domain ID list obtained at the commencement of the ISSU. Similarly, a downstream principal switch within a fabric may also store a domain ID list such that the current domain ID list propagated by switch 'X' does not overwrite the domain ID list.

After comparing EFP request frames, e.g., domain ID lists or snapshots of domain ID lists, it is determined in step 329 whether the current domain ID list matches the stored domain ID list. In one embodiment, switch 'X' determines whether there is a mismatch between the current domain ID list and the stored domain ID list. In another embodiment, a downstream switch may compare the current domain ID list with a stored domain ID list. Although a mismatch may be generally be detected if the domain IDs in the domain ID lists do not match, a mismatch may also be detected if the order in which the domain IDs are listed in the current domain ID list and in the stored domain ID list do not match.

If it is determined in step 329 that there is no mismatch between the EFP request frames, e.g., the current domain ID list and the stored domain ID list, the indication is that there has been no state change associated with the SAN fabric that occurred while the ISSU was occurring. As such, a recovery action within or a reconfiguration of the SAN fabric is not necessary, and the method of processing an ISSU is completed. Alternatively, if it is determined in step 329 that there is a mismatch between the current domain ID list and the stored domain ID list, the implication is that a recovery action is needed in order to substantially resynchronize an associated virtual SAN (VSAN) associated with the SAN fabric. Therefore, process flow moves to step 333 in which a recovery action is triggered in the SAN fabric. The method of processing an ISSU is completed once the recovery action is triggered.

When a recovery action is triggered in the SAN fabric, a process of selecting a principal switch and of obtaining domain IDs from the principal switch is typically commenced. In one embodiment, a resynchronization phase may be triggered. As will be appreciated by those skilled in the art, the resynchronization phase may be initiated with the propagation of BF or RCF frames as a part of a BF process or an RCF process, respectively. Upon triggering a recovery action in the SAN fabric, the method of processing an ISSU is completed.

Figure 4:
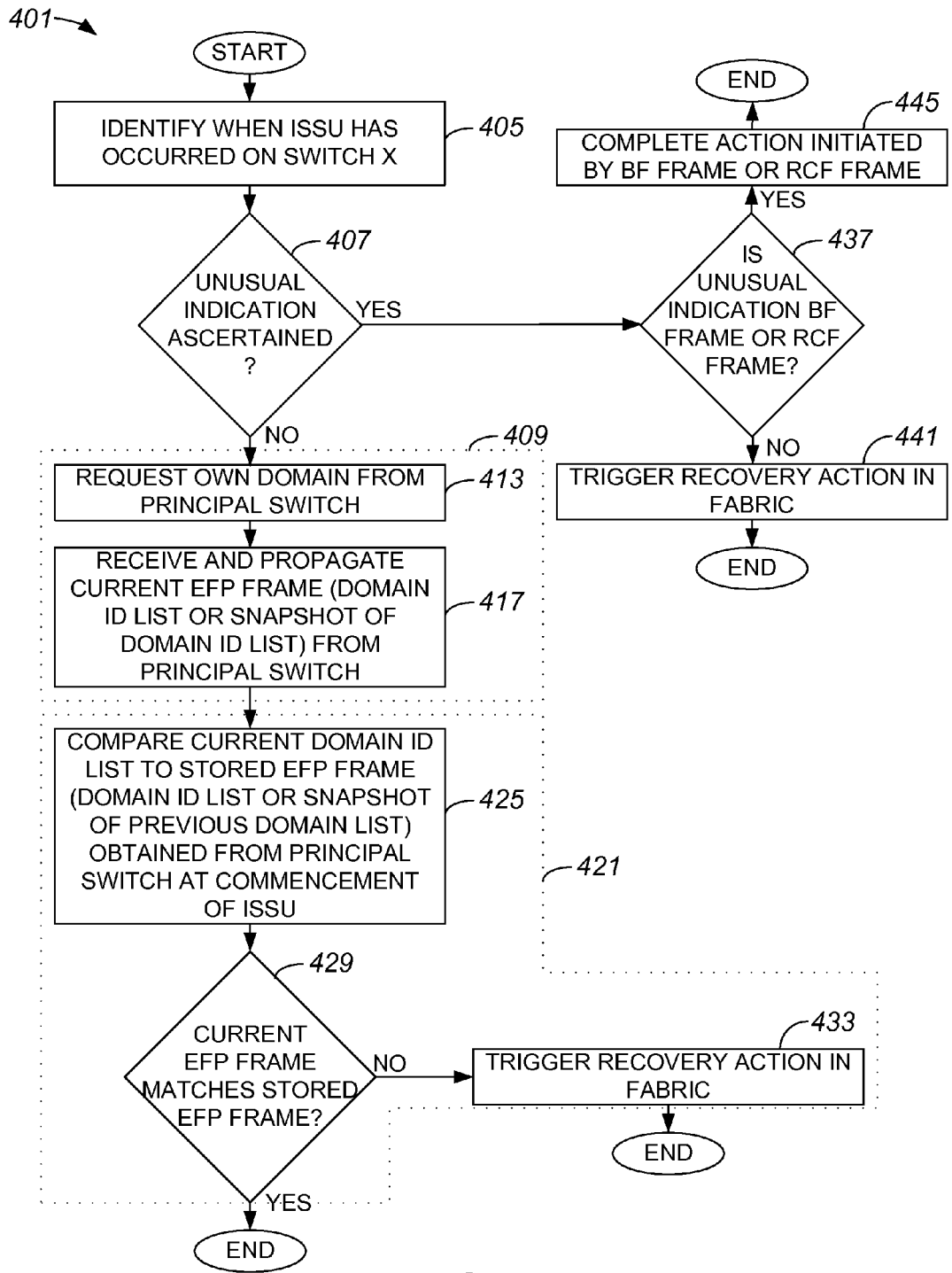
FIG. 4 is a process flow diagram which illustrates a method of processing an ISSU that includes allowing a recovery action to be triggered by the receipt of an unusual indication in accordance with an embodiment of the present invention.

In addition to triggering a recovery action if there is a mismatch in domain ID lists, a recovery action may also be triggered by a switch when the switch determines that an "unusual" occurrence has occurred. By way of example, if a switch receives an EFP frame without first receiving a corresponding BF frame, a recovery action may be triggered. It should be appreciated that the switch may receive an EFP frame without first receiving a corresponding BF frame if the BF frame was sent to the switch during the duration of the ISSU. FIG. 4 is a process flow diagram which illustrates a method of processing an ISSU that includes allowing a recovery action to be triggered by the receipt of an unusual indication in accordance with an embodiment of the present invention. A method 401 of processing an ISSU state change begins at step 405 in which it is identified when an ISSU has occurred on switch 'X'. Once an ISSU has been identified, e.g., when it is determined that and ISSU has been substantially completed, a determination is made in step 407 as to whether an unusual indication has been ascertained. In one embodiment, when an ISSU is substantially completed with respect to switch 'X', switch 'X' determines whether it has received an unexpected frame within a particular amount of time after the substantial completion of the ISSU.

If it is determined in step 407 that an unusual indication has been ascertained, then in step 437, it is determined if the unusual indication is the receipt of either a BF frame or an RCF frame. The receipt of a BF frame or an RCF frame may indicate that another switch within a fabric is attempting to select a principal switch associated with a VSAN. If it is determined that the unusual indication is the receipt of a BF frame or an RCF frame, the implication is that a priority switch selection is in process. As such, process flow moves to step 445 in which an action effectively initiated by the BF frame or the RCF frame is completed. By way of example, a priority switch selection process may be completed. Upon completion of the action initiated by the BF frame or the RCF frame, the method of processing an ISSU state change is completed.

Alternatively, if it is determined in step 437 that the unusual indication is not a BF frame or an RCF frame, then the unusual indication may be an EFP frame received as a part of an EFP frame exchange, e.g., an EFP frame exchange that is a part of a priority switch selection process. Accordingly, in step 441, a recovery action is triggered in the fabric, and the method of processing an ISSU state change is completed Returning to step 407, if the determination is that no unusual indication has been ascertained, then a SAN state retrieval is performed at an overall step 409. Overall step 409 includes step 413 and step 417. In step 413, switch 'X' requests a domain ID from a principal switch of the fabric. That is, switch 'X' requests its own domain ID from the principal switch. Such a domain ID may be received, as previously described, as a part of an EFP frame. Once switch 'X' requests the domain ID, switch 'X' receives the domain ID as well as a list of current domain IDs recognized by the principal switch in the fabric in step 417. Switch 'X' receives and propagates the current domain ID list or a snapshot of the domain ID list. That is, in one embodiment, switch 'X' receives and propagates the current EFP frame the contains the current domain ID list and associated WWNs.

After propagating the current domain ID list, a post ISSU state change detection and recovery is performed in an overall step 421, which includes step 425, step 429, and step 433. In step 425, a current EFP frame is compared to a stored EFP frame, e.g., a current domain ID list is compared to a stored domain ID list. It is then determined in step 429 whether the current domain ID list matches the stored domain ID list. If it is determined in step 429 that there is no mismatch between the current domain ID list and the stored domain ID list, the method of processing an ISSU is completed. Alternatively, if the determination in step 429 is that there is a mismatch between the current domain ID list and the stored domain ID list, a recovery action is triggered in the SAN fabric in step 433, and then the method of processing an ISSU is completed.

Figure 5A:
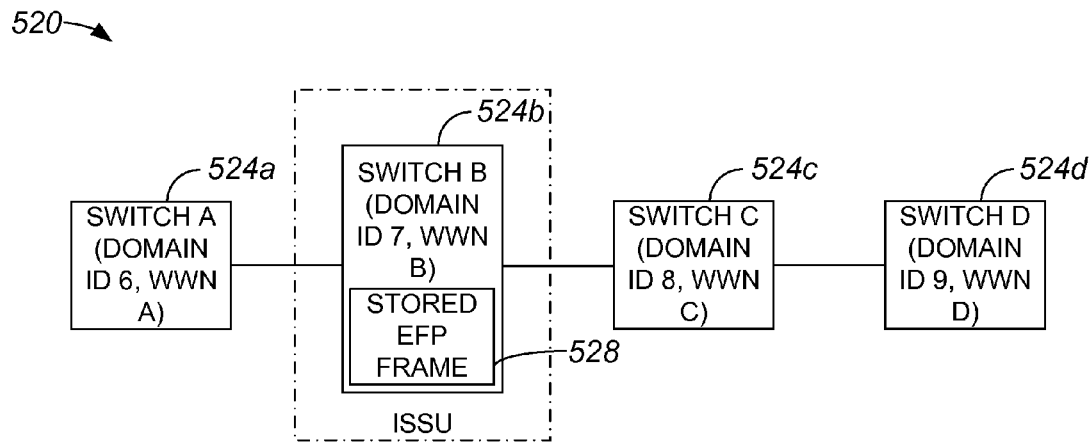
FIG. 5A is a diagrammatic representation of a first network at a time 't1' during which an ISSU is occurring on a switch of the network in accordance with an embodiment of the present invention.

With reference to FIGS. 5A-D, an overall process of triggering a recovery action in a fabric in response to a flap that is downstream from a particular switch on which an ISSU occurs will be described in accordance with an embodiment of the present invention. FIG. 5A is a diagrammatic representation of a first network at a time 't1' during which an ISSU is occurring on a switch of the network in accordance with an embodiment of the present invention. A SAN 520 includes a plurality of switches 524a-d that are substantially linearly connected. As will be appreciated by those skilled in the art, SAN 520 may be either be a substantially linear network or a substantially non-linear network. In the described embodiment, however, SAN 520 is a substantially linear network. A switch 'A' 524a has a domain ID '6' and a WWN 'A', a switch 'B' 524b has a domain ID '7' and a WWM 'B', a switch 'C' has a domain ID '8' and a WWM 'C', and a switch 'D' has a domain ID '9' and a WWN 'D'. In the described embodiment, switch 'A' 524a is a principal switch associated with SAN 520, while an ISSU process is performed with respect to switch 'B' 524b. As shown, either prior to or during the ISSU process, a domain ID list 528 is stored by switch 'B' 524b. Domain ID list 528 includes the domain IDs of each switch 524a-d, and may also include the WWNs of each switch 524a-d.

Figure 5B:
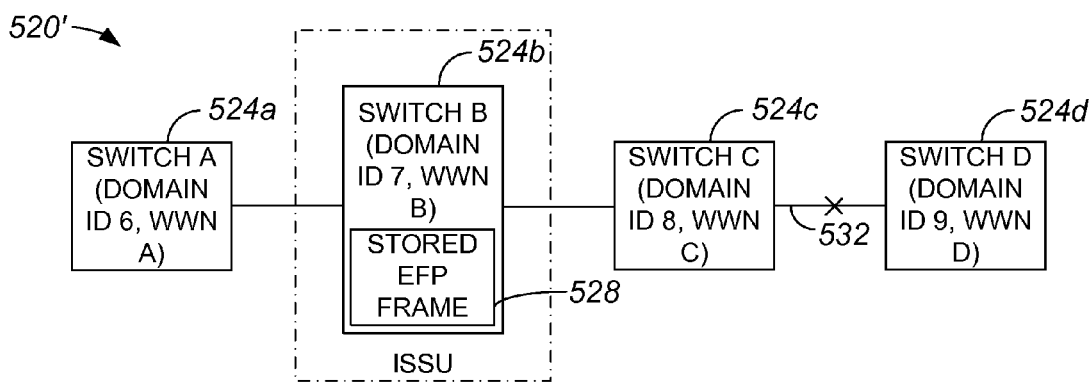
FIG. 5B is a diagrammatic representation of a network, e.g., network 520 of FIG. 5A, at a time 't2' during which an ISSU is occurring on a switch of the network and a flap occurs on a link downstream from the switch in accordance with an embodiment of the present invention.

At a time 't2', as shown in FIG. 5B, an ISSU is still occurring with respect to switch 'B' 524b, a flap occurs on a link 532 within network 520' between switch 'C' 524c and switch 'D' 524d. That is, a flap occurs downstream from switch 'B' 524b. When the flap occurs, link 532 is at least temporarily out of service or otherwise not usable. Once the flap is resolved, e.g., if the flap involves link 532 going down and then coming back up, switch 'C' 524c and switch 'D' 524d undergo a priority switch selection process, e.g., by exchanging BF or RCF frames and EFP frames.

Figure 5C:
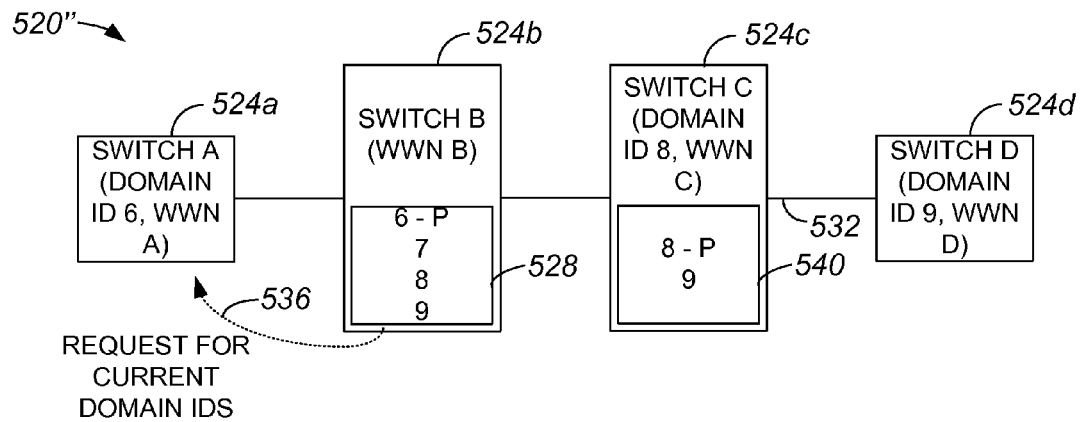
FIG. 5C is a diagrammatic representation of a network, e.g., network 520 of FIG. 5A, at a time 't3' after which an ISSU has occurred on a switch and after which a downstream flap has occurred on a link, and at which the switch requests a domain identifier (ID) from a principal switch in accordance with an embodiment of the present invention.

FIG. 5C is a diagrammatic representation of network 520 at a time 't3' after which an ISSU has occurred on a switch and after which a downstream flap has occurred on a downstream link in accordance with an embodiment of the present invention. As shown, once the ISSU is completed with respect to switch 'B' 524b within network 520", switch 'B' 524b sends a request 536 for a domain ID, e.g., its own domain ID, and for a list of current domain IDs associated with switch 'A' 524a. It is noted that stored domain ID list 528 is maintained in switch 'B' 524b such that when a current domain ID list (not shown) is received from switch 'A' 524a, the current domain ID list does not overwrite stored domain ID list 528.

Figure 5D:
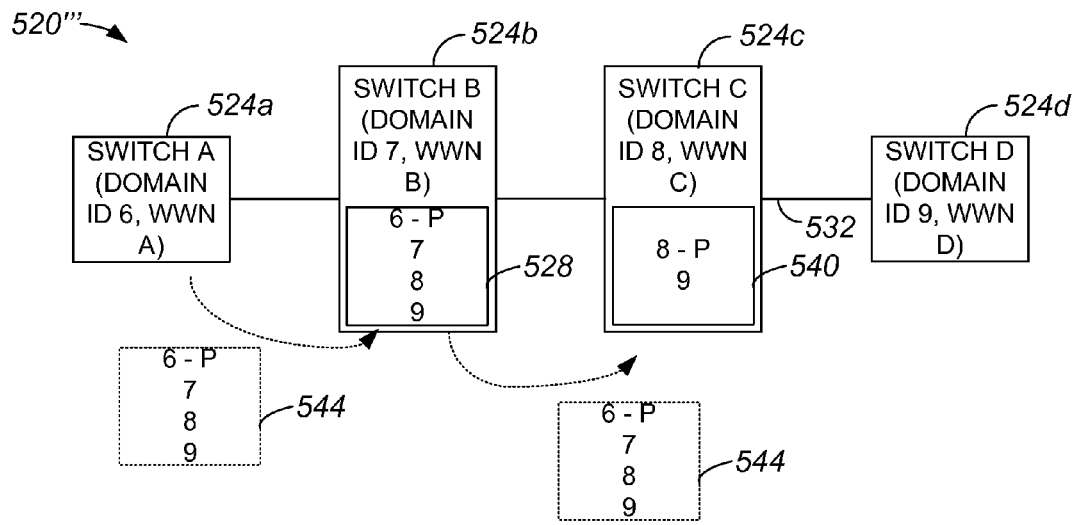
FIG. 5D is a diagrammatic representation of a network, e.g., network 520 of FIG. 5A, at a time 't4' at which a principal switch provides an EFP frame that contains a domain ID list to a switch on which an ISSU has occurred for comparison purposes in accordance with an embodiment of the present invention.

Switch 'A' 524a generally receives request 536, and provides a response to switch 'B' 524b at a time 't4'. FIG. 5D is a diagrammatic representation of network 520 at a time 't4' at which a principal switch provides a domain ID and an updated domain list to a switch on which an ISSU has occurred in accordance with an embodiment of the present invention. At a time 't4' within network 520', switch 'A' 524a provides a current domain ID list 544 to switch 'B' 524b. Current domain ID list 544 includes a domain ID assigned by switch 'A' 524a to switch 'B' 524b. In the described embodiment, switch 'B' 524b is reassigned a domain ID '7'.

As shown in FIG. 5C, switch 'C' 524c may store a domain ID list 540 which indicates the domains that switch 'C' 524c, as a principal switch, may be responsible for. Because switch 'C' 524c was selected as a principal switch for switch 'D' 524d, domain ID list 540 indicates that switch 'C' 524c is a principal switch in a VSAN that includes switch 'D' 524d. It should be appreciated that if switch 'D' 524d stores a domain ID list (not shown), the domain ID list stored by switch 'D' 524d will indicate that switch 'C' 524c is a principal switch in a VSAN that includes switch 'D' 524d.

Returning to FIG. 5D, once switch 'B' 524b receives current domain ID list 544, switch 'B' 524b compares stored domain ID list 528 with current domain ID list 544 to determine whether there is a mismatch. As previously discussed, such a comparison is generally associated with an overall comparison between a received EFP, i.e., an EFP that includes current domain ID list 544, and a stored EFP, i.e., an EFP that was associated with stored domain ID list 528. In one embodiment, the comparison includes comparing both WWNs and domain IDs. Switch 'B' 524b also forward current domain ID list 544 to switch 'C' 524c, which compares current domain ID list 544 to domain ID list 540. While switch 'B' 524b does not detect a mismatch between current domain ID list 544 and stored domain ID list 528, switch 'C' 524c detects a mismatch between current ID domain list 544 and domain ID list 540. Hence, switch 'C' 524c may trigger a reconfiguration within network 520'''.

In general, a flap may occur either upstream from or downstream from a switch on which an ISSU is occurring. That is, a flap may either occur in a fabric between a principal switch and a switch on which an ISSU is occurring, or a flap may occur in a fabric away from the principal switch. Referring next to FIGS. 6A-D, an overall process of triggering a recovery action in a fabric in response to a flap that is upstream from a particular switch on which an ISSU occurs will be described in accordance with an embodiment of the present invention.

Figure 6A:
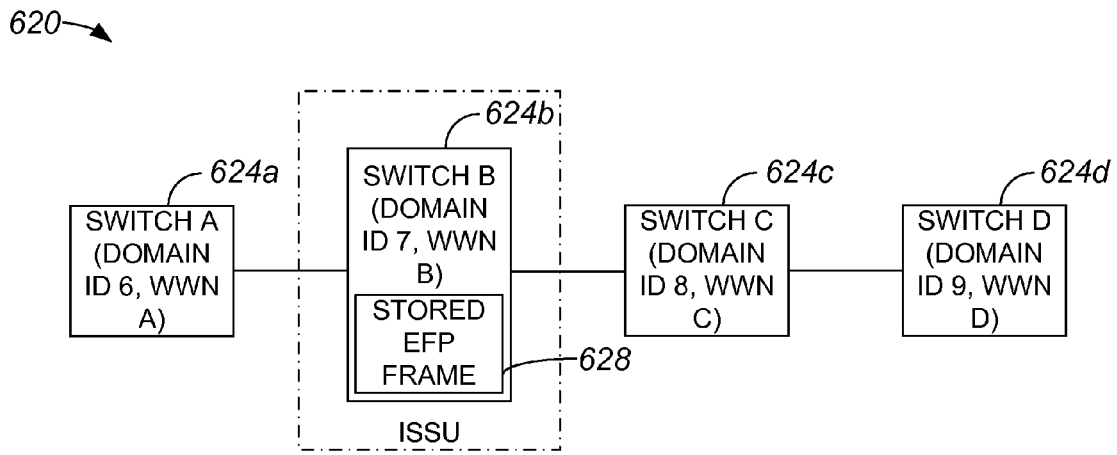
FIG. 6A is a diagrammatic representation of a second network at a time 't1' during which an ISSU is occurring on a switch of the network in accordance with an embodiment of the present invention.

FIG. 6A is a diagrammatic representation of a network at a time 't1' during which an ISSU is occurring on a switch of the network in accordance with an embodiment of the present invention. At a time 't1', within a network 620 that includes switches 624a-d, an ISSU is occurring with respect to a switch 'B' 624b. Prior to, or at the beginning of, the ISSU, switch 'B' 624b may store an EFP frame 628, e.g., a domain ID list, obtained from a principal switch which, in the described embodiment, is switch 'A' 624a.

Figure 6B:
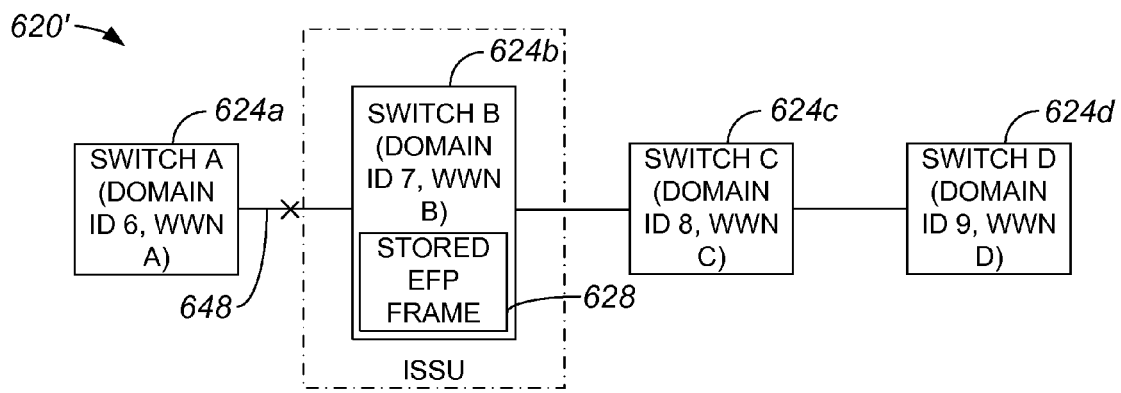
FIG. 6B is a diagrammatic representation of a network, e.g., network 620 of FIG. 6A, at a time 't2' during which an ISSU is occurring on a switch of the network and a flap occurs on a link upstream, from the switch in accordance with an embodiment of the present invention.

At a time 't2', as shown in FIG. 6B, a flap occurs on a link 648 that is upstream from switch 'B' 624b. The flap occurs while the ISSU is still ongoing with respect to switch 'B' 624b. After the flap is resolved, e.g., after link 648 goes back online after being offline, switch 'A' 624a may effectively perform a priority switch selection process. In the described embodiment, switch 'A' 624a identifies itself as a priority switch in a VSAN that includes substantially only switch 'A' 624a.

Figure 6C:
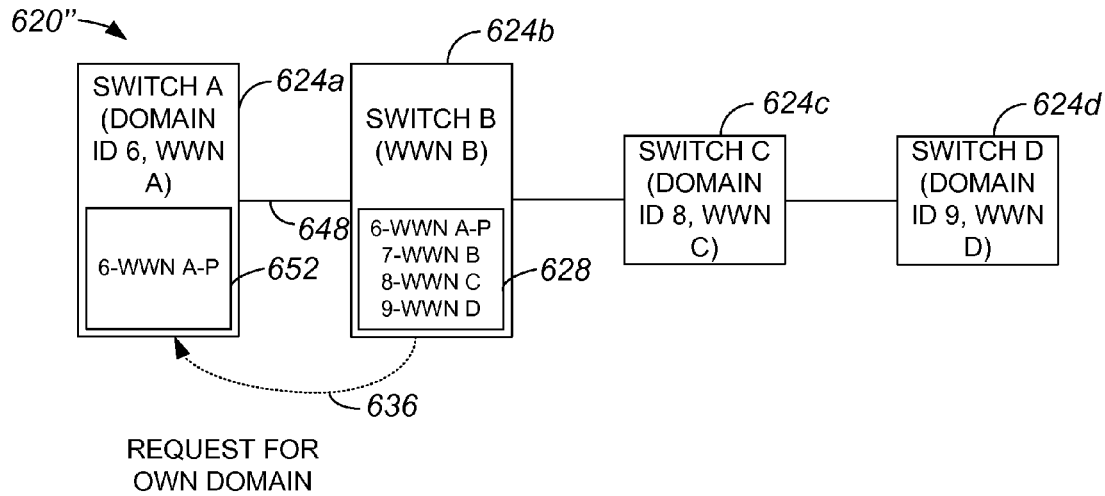
FIG. 6C is a diagrammatic representation of a network, e.g., network 620 of FIG. 6A, at a time 't3' after which an ISSU has occurred on a switch and after which an upstream flap has occurred on a link, and at which the switch requests a domain ID from a principal switch in accordance with an embodiment of the present invention.

FIG. 6C is a diagrammatic representation of network 620 at a time 't3' after an ISSU has been completed with respect to witch 'B' 624b and after which an upstream flap has occurred on link 628 in accordance with an embodiment of the present invention. Within network 620'' at a time 't3', switch 'B' 624b sends a request 636 to switch 'A' 624a for a domain ID, i.e., its own domain ID. Such a request 636 may effectively be a request for both its own domain ID and a current domain ID list. Switch 'A' 624a, which has a domain ID list 652 that identifies switch 'A' as a principal switch, receives request 636 and processes the request.

Figure 6D:
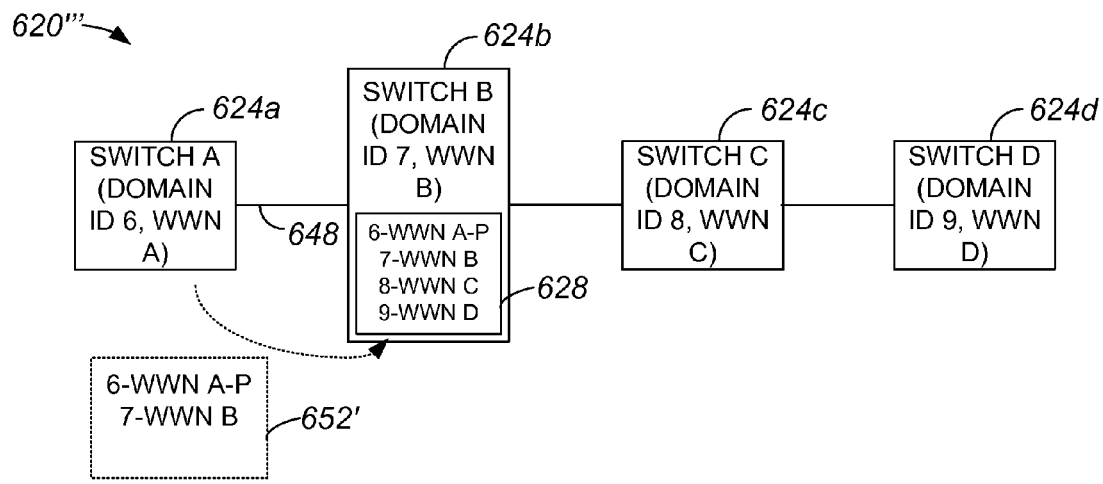
FIG. 6D is a diagrammatic representation of a network, e.g., network 620 of FIG. 6A, at a time 't4' at which a principal switch provides an EFP frame to a switch on which an ISSU has occurred for comparison purposes in accordance with an embodiment of the present invention.

FIG. 6D is a diagrammatic representation of network 620 at a time 't4' at which a principal switch 'A' 624a provides a domain ID and an updated domain ID list to switch 'B' 624b in accordance with an embodiment of the present invention. At a time 't4' within network 620''', switch 'A' 624a provides a current EFP frame 652' that contains a current domain ID list 652' to switch 'B' 624b such that switch 'B' 624b may compare EFP frame 628 with frame 652' to identify any mismatch. Current domain ID list 652' identifies switch 'B' 624b as being assigned a domain ID '7'. As there is a mismatch between EFP frame 652' and stored EFP frame 628, switch 'B' 624b will typically detect the mismatch and trigger a recovery process within network 620''.

Figure 7A:
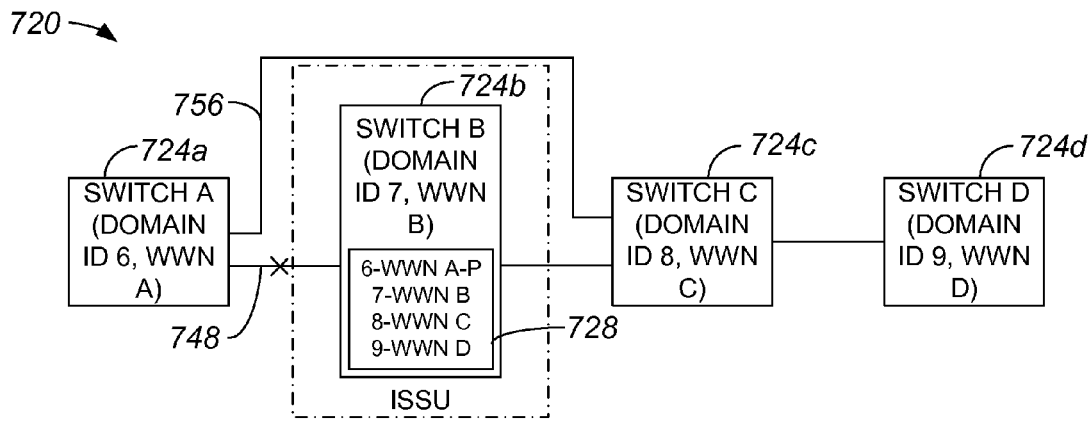
FIG. 7A is a diagrammatic representation of a third network at a time 't1' during which an ISSU is occurring on a switch of the network while a flap occurs in accordance with an embodiment of the present invention.

Network 520 of FIG. 5A and network 620 of FIG. 6A are effectively linear networks. It should be appreciated, however, that a SAN fabric may be non-linear. Referring next to FIGS. 7A-D, an overall process of triggering a recovery action in a non-linear fabric in response to a flap that is upstream from a particular switch on which an ISSU occurs will be described in accordance with an embodiment of the present invention. FIG. 7A is a diagrammatic representation of a non-linear network at a time 't1' during which an ISSU is occurring on a switch of the network while a flap occurs in accordance with an embodiment of the present invention. Within a network 720 that includes switches 724a-d, a principal switch 'A' 724a is substantially directly connected to both a switch 'B' 724b and a switch 'C' 724c. Switch 'A' 724a is in communication with switch 'B' 724b across a link 748, and in communication with switch 'C' 724c across a link 756.

When an ISSU is initiated with respect to switch 'B' 724b, switch 'B' 724b request an EFP frame 728 from switch 'A' 724a, and stores EFP frame list 728. At a time 't1' while an ISSU is occurring with respect to switch 'B' 724b, a flap occurs on link 748. When the flap occurs on link 748, switch 'A' 724a is still linked to switch 'C' 724c.

Figure 7B:
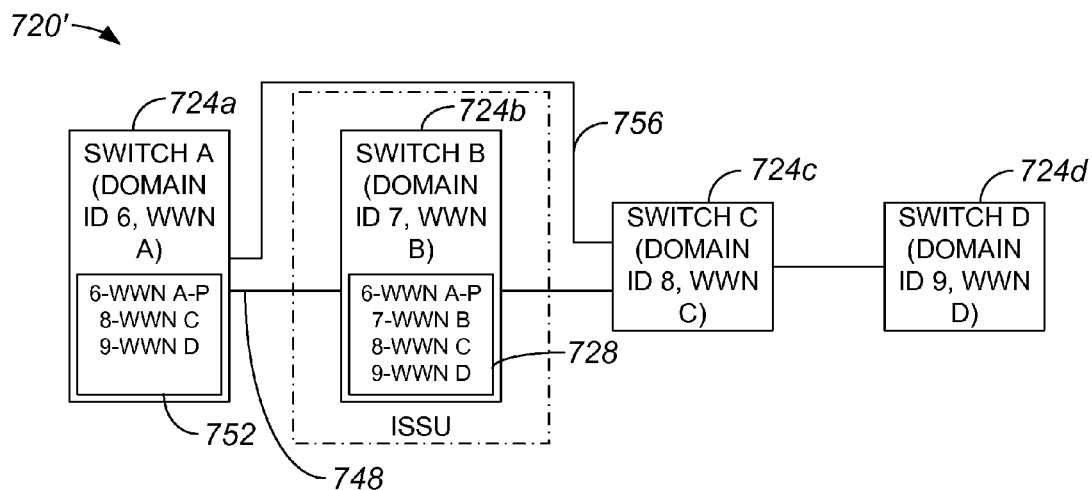
FIG. 7B is a diagrammatic representation of a network, e.g., network 720 of FIG. 7A, at a time 't2' at which a principal switch has stored a current EFP frame in accordance with an embodiment of the present invention.

At a time 't2' within network 720', as shown in FIG. 7B, the flap on link 748 is resolved, and a principal switch selection process is performed such that switch 'A' 724a is designated as a principal switch and stored EFP frame 752. In the described embodiment, the ISSU is still ongoing with respect to switch 'B' 724b. As shown, EFP frame 752 does not include a reference to the domain ID of switch 'B' 724b, as switch B' 724b is busy performing an ISSU and, hence, does not detect the flap that occurred with respect to link 748.

Figure 7C:
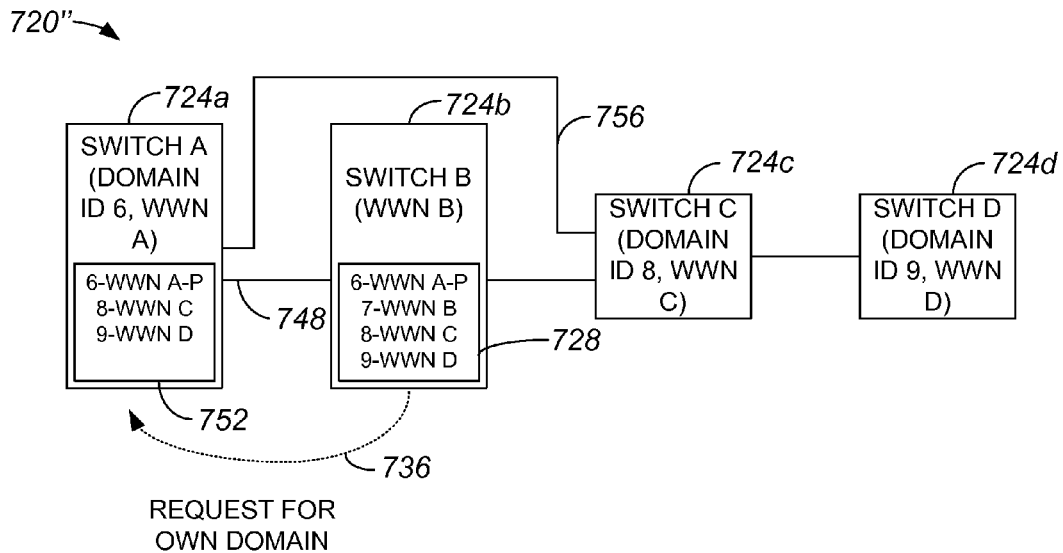
FIG. 7C is a diagrammatic representation of a network, e.g., network 720 of FIG. 7A, at a time 't3' at which the switch on which the ISSU has occurred requests a domain ID from a principal switch in accordance with an embodiment of the present invention.
Figure 7D:
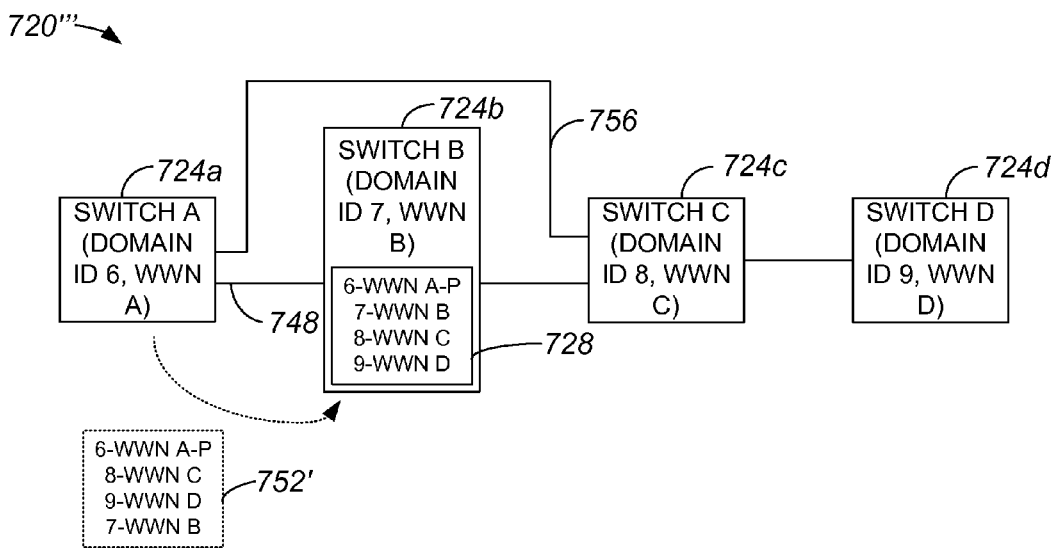
FIG. 7D is a diagrammatic representation of a network, e.g., network 720 of FIG. 7A, at a time 't4' at which a principal switch provides a domain ID and an updated domain list in an EFP frame to a switch on which an ISSU has occurred for comparison purposes in accordance with an embodiment of the present invention.

With respect to FIG. 7C, network 720 will be described at a time 't3' at which the switch on which the ISSU has occurred requests its own domain ID from a principal switch in accordance with an embodiment of the present invention. Within network 720'' at a time 't3', switch 'B' 724b sends a request 736 to switch 'A' 724a for its own domain ID. Then, at a time 't4' as shown in FIG. 7D, switch 'A' 724a, which is a principal switch within network 720''', provides a new domain ID to switch 'B' 724b in a current domain ID list 752'. In the described embodiment, switch 'B' 724b is assigned domain ID '7,' or its original domain ID. However, it should be appreciated that switch 'B' 724b may instead be assigned a different domain ID.

When switch 'B' 724b compares current EFP frame 752' and stored EFP frame 728, switch 'B' 724b will detect a mismatch even though the same domain IDs appear in each EFP frame. The mismatch is detected because the ordering of domain IDs in EFP frame 752' is different from the ordering of IDs in stored EFP frame 728. Hence, switch 'B' 724b will trigger a reconfiguration within network 720'''.

Figure 8:
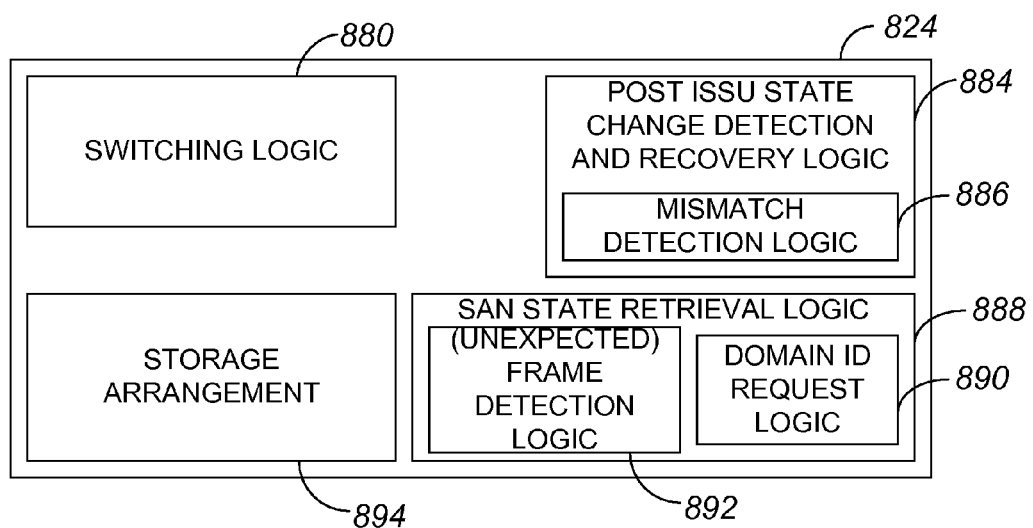
FIG. 8 is a block diagram representation of a non-redundant or single-supervisor switch which includes SAN state retrieval logic as well as post ISSU state change detection and recovery logic in accordance with an embodiment of the present invention.

The configuration of a switch or, more generally, an element in a SAN fabric may vary. In one embodiment, a switch is a single-supervisor switch. FIG. 8 is a block diagram representation of a non-redundant or single-supervisor switch which includes SAN state retrieval logic as well as post ISSU state change detection and recovery logic in accordance with an embodiment of the present invention. A switch 824 includes switching logic 880 that allows switch 824 to receive and to forward or otherwise propagate data. Switching logic 880 includes hardware and or software logic that obtains data from a network and propagates the data through the network as appropriate. Switching logic 880, in one embodiment, includes logic that enables switch 824 to participate in a process of selecting a principal switch.

Switch 824 also includes SAN state retrieval logic 888 and post ISSU state change detection/recovery logic 884. SAN state retrieval logic 888 includes domain ID request logic 890 that is arranged to request a domain ID from a principal switch. Using domain ID request logic 890, switch 824 may retrieve a domain ID list (not shown) and a principal switch identity of a VSAN. SAN state retrieval logic 888 also includes frame detection logic 892 that is arranged to determine whether an unexpected frame has been received on switch 824 while switch 824 is undergoing an ISSU. For example, frame detection logic 892 may detect when an unexpected EFP frame is received by switch 824.

In the described embodiment, domain ID request logic 890 is further configured to request a domain ID list (not shown) from a principal switch at the commencement of an ISSU or during the ISSU. It should be appreciated that when domain ID request logic 890 requests a domain ID from a principal switch upon the completion of an ISSU, domain ID request logic 890 may also request a current domain ID list (not shown) from the principal switch. As will be understood by those in the art, a domain ID list (not shown) may be sent to switch 824 in an updated EFP frame by a principal switch once a domain ID is assigned to switch 824. In other words, a principal switch may provide the updated EFP frame as a notification to substantially all other switches within a fabric each time a new domain ID has been assigned within the fabric.

Post ISSU state change detection/recovery logic 884 is generally configured to detect when a state change has occurred during an ISSU performed on switch 824. That is, post ISSU state change detection/recovery logic 884 effectively detects if there is any difference between the state of a SAN fabric before and after a software upgrade. Post ISSU state change detection/recovery logic 884 includes mismatch detection logic 886 that is arranged to compare a domain ID list (not shown), e.g., a snapshot of a domain ID list stored in a storage arrangement 894, with a current domain ID list (not shown) obtained from a principal switch associated with switch 824. By comparing domain ID lists, mismatch detection logic 886 determines whether there is a mismatch between the lists.

In general, substantially any software logic associated with switch 824 may be updated using an ISSU. By way of example, portions of switching logic 880 that includes software logic may be updated during an ISSU, portions of SAN state retrieval logic 888 that include software logic may be updated during an ISSU, and portions of post ISSU state change detection/recovery logic 884 that include software logic may be updated during an ISSU.

Although only a few embodiments of the present invention have been described, it should be understood that the present invention may be embodied in many other specific forms without departing from the spirit or the scope of the present invention. By way of example, while a network has been described as being reconfigured substantially only when it is determined after an ISSU that there has been a state change, a reconfiguration of the network may generally be performed substantially any time a state change has been detected. That with, the present invention is not limited to use upon the completion of an ISSU.

In general, the configuration of an overall network may be widely varied. That is, the configuration of a SAN fabric in which a reconfiguration or recovery process may be triggered based on a mismatch detection may vary widely. Further, the triggering of a recovery process is not limited to being initiated by a switch. Substantially any suitable component associated with a SAN fabric may trigger a recovery process based on a state change.

While a recovery action may be triggered if a previous domain ID list does not match a current domain ID list, a recovery action is not limited to being triggered when the previous domain ID list does not match the current domain ID list. By way of example, a recovery action may also be triggered if a current domain ID list may not be obtained.

The steps associated with the methods of the present invention may vary widely. Steps may be added, removed, altered, combined, and reordered without departing from the spirit of the scope of the present invention. For example, a method of processing an ISSU that includes determining if an unusual indication is received has been described as including comparing snapshots of domain ID lists. It should be appreciated, however, that a method which includes determining if an unusual indication is received does not necessarily include also comparing snapshots of domain ID lists. Therefore, the present examples are to be considered as illustrative and not restrictive, and the invention is not to be limited to the details given herein, but may be modified within the scope of the appended claims.

What is claimed is:

1. A method comprising:
   undergoing an update process, the update process being arranged to update software associated with a switch, the switch being included in a storage area network (SAN) fabric;
   determining when the update process is completed;
   ascertaining whether there is at least one state change associated with the SAN fabric if it is determined that the update process is completed, wherein ascertaining whether there is at least one state change associated with the SAN fabric includes obtaining a current domain identifier (ID) list if it is determined that the update process is completed, the current domain ID list being arranged to include domain IDs currently associated with the SAN fabric, and determining if there is at least one mismatch between the current domain ID list and a previous domain ID list, the previous domain ID list being arranged to include domain IDs associated with the SAN fabric before the update process, wherein the at least one mismatch indicates at least one state change; and
   initiating a recovery action in the SAN fabric if it is determined that there is at least one state change associated with the SAN fabric.

2. The method of claim 1 wherein initiating the recovery action in the SAN fabric includes initiating the recovery action if it is determined that there is at least one mismatch between the current domain ID list and the previous domain ID list.

3. The method of claim 1 further including:
   obtaining the previous domain ID list before undergoing the update process; and
   storing the previous domain ID list.

4. The method of claim 1 wherein obtaining the current domain ID list includes requesting a domain ID from a principal switch in with the SAN fabric, and receiving the domain ID and the current domain ID list from the principal switch.

5. The method of claim 1 wherein initiating the recovery action includes initiating a build frame process or initiating a reconfigure fabric process.

6. The method of claim 1 wherein ascertaining whether there is at least one state change associated with the SAN fabric includes determining if an unusual indication has been obtained by the switch.

7. The method of claim 6 wherein the unusual indication is a receipt of an exchange fabric parameters frame by the switch.

8. The method of claim 1 wherein the update process is an in service software update which allows software to be updated while the switch is in operation to route data in the SAN fabric.

9. The method of claim 1 wherein the state change is a failure of a link within the SAN fabric.

10. A method comprising:
undergoing an update process, the update process being arranged to update software associated with a switch, the switch being included in a storage area network (SAN) fabric;
determining when the update process is completed;
ascertaining whether there is at least one state change associated with the SAN fabric if it is determined that the update process is completed, wherein ascertaining whether there is at least one state change associated with the SAN fabric includes obtaining an exchange fabric parameters (EFP) frame if it is determined that the update process is completed, the EFP frame being arranged to include domain IDs currently associated with the SAN fabric, and determining if there is at least one mismatch between the current EFP frame and a previous EFP frame, the previous EFP frame being arranged to include domain IDs associated with the SAN fabric before the update process, wherein the at least one mismatch indicates at least one state change; and
initiating a recovery action in the SAN fabric if it is determined that there is at least one state change associated with the SAN fabric.

11. One or more non-transitory tangible media upon which logic is encoded for execution and the logic, when executed, operable to:
perform an update process on a switch, the switch being included in a storage area network (SAN) fabric;
determine when the update process is completed;
ascertain whether there is at least one state change associated with the SAN fabric if it is determined that the update process is completed, wherein the logic operable to ascertain whether there is at least one state change associated with the SAN fabric is further operable to obtain a current domain identifier (ID) list if it is determined that the update process is completed, the current domain ID list being arranged to include domain IDs currently associated with the SAN fabric, and further operable to determine if there is at least one mismatch between the current domain ID list and a previous domain ID list, the previous domain ID list being arranged to include domain IDs associated with the SAN fabric before the update process, wherein the at least one mismatch indicates at least one state change; and
initiate a recovery action in the SAN fabric if it is determined that there is at least one state change associated with the SAN fabric.

12. The one or more non-transitory tangible media of claim 11 wherein the logic operable to initiate the recovery action in the SAN fabric is further operable to initiate the recovery action if it is determined that there is at least one mismatch between the current domain ID list and the previous domain ID list.

13. The one or more non-transitory tangible media of claim 11 wherein the logic is further operable to:
obtain the previous domain ID list before performing the update process; and
store the previous domain ID list.

14. The one or more non-transitory tangible media of claim 11 wherein the logic operable to obtain the current domain ID list is further operable to request a domain ID from a principal switch in with the SAN fabric, and further operable to receive the domain ID and the current domain ID list from the principal switch.

15. The one or more non-transitory tangible media of claim 11 wherein the logic operable to initiate the recovery action is further operable to initiate a build frame process or to initiate a reconfigure fabric process.

16. The one or more non-transitory tangible media of claim 11 wherein the logic operable to ascertain whether there is at least one state change associated with the SAN fabric is further operable to determine if an unusual indication has been obtained by the switch.

17. The one or more non-transitory tangible media of claim 16 wherein the unusual indication is a receipt of an exchange fabric parameters frame by the switch.

18. The one or more non-transitory tangible media of claim 11 wherein the update process is an in service software update which allows a first set of software logic to be updated while the switch is in operation to route data in the SAN fabric.

19. An apparatus comprising:
switching logic, the switching logic including hardware that obtains data, the switching logic being arranged to route the data received by the apparatus;
logic arranged to be updated by an in service software update (ISSU);
switched area network (SAN) state retrieval logic, the SAN state retrieval logic being arranged to obtain a current domain ID list associated with a SAN; and
post ISSU state change detection and recovery (PISCDAR) logic, the PISCDAR logic being arranged to use the current domain ID list to determine if a state change has occurred, the PISCDAR logic further being arranged to initiate a reconfiguration process in the SAN if it is determined that the state change has occurred.

20. The apparatus of claim 19 wherein the PISCDAR logic is arranged to use the current domain ID list to determine if the state change has occurred by comparing the current domain ID list with a previous domain ID list associated with the SAN and determining if a mismatch is present between the current domain ID list and the previous domain ID list.

21. The apparatus of claim 19 wherein the current domain ID list is obtained as a part of an exchange fabric parameters (EFP) request frame.

22. One or more non-transitory tangible media upon which logic is encoded for execution and the logic, when executed, operable to:
perform an update process on a switch, the switch being included in a storage area network (SAN) fabric;
determine when the update process is completed;
ascertain whether there is at least one state change associated with the SAN fabric if it is determined that the update process is completed, wherein the logic operable to ascertain whether there is at least one state change associated with the SAN fabric includes logic operable to obtain an exchange fabric parameters (EFP) frame if it is determined that the update process is completed, the EFP frame being arranged to include domain IDs currently associated with the SAN fabric, and logic operable to determine if there is at least one mismatch between the current EFP frame and a previous EFP frame, the previous EFP frame being arranged to include domain IDs associated with the SAN fabric before the update process, wherein the at least one mismatch indicates at least one state change; and initiate a recovery action in the SAN fabric if it is determined that there is at least one state change associated with the SAN fabric.

\* \* \* \* \*